H. K. JONES.
AUXILIARY COASTER BRAKE ATTACHMENT.
APPLICATION FILED APR. 27, 1910.
975,432.
Patented Nov. 15, 1910.
3 SHEETS—SHEET 1.
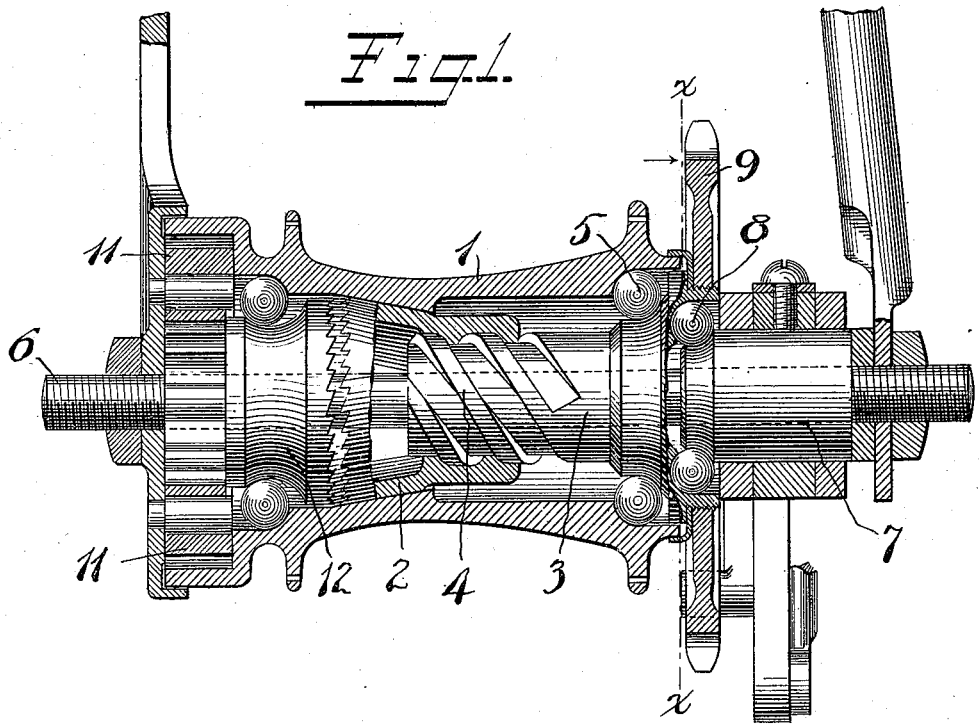
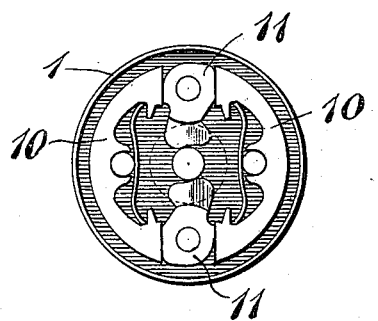
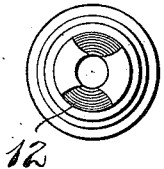
Witnesses:
Fred. K. M. Dannenfelser.
Inventor
HORACE K. JONES
By his Attorneys H. K. JONES.
AUXILIARY COASTER BRAKE ATTACHMENT.
APPLICATION FILED APR. 27, 1910.
975,432.
Patented Nov. 15, 1910.
3 SHEETS—SHEET 2.
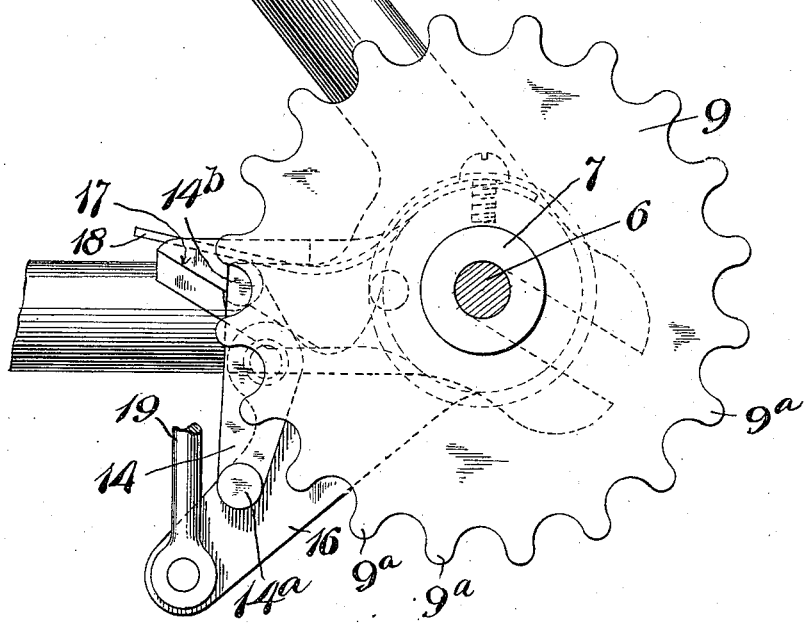
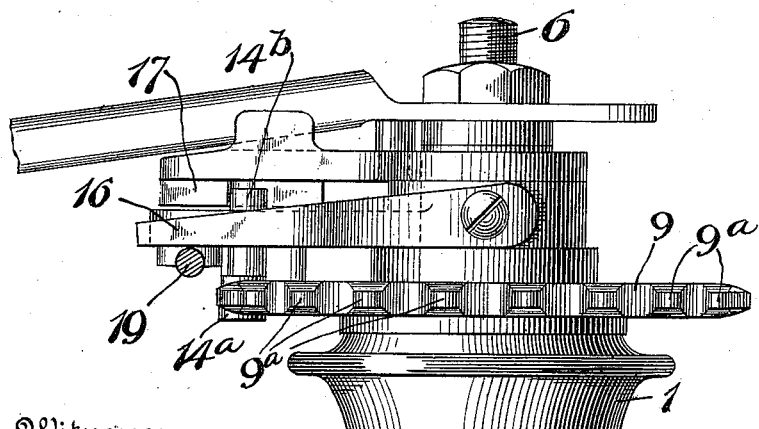

H. K. JONES.
AUXILIARY COASTER BRAKE ATTACHMENT.
APPLICATION FILED APR. 27, 1910.
975,432.
Patented Nov. 15, 1910.
3 SHEETS—SHEET 3.
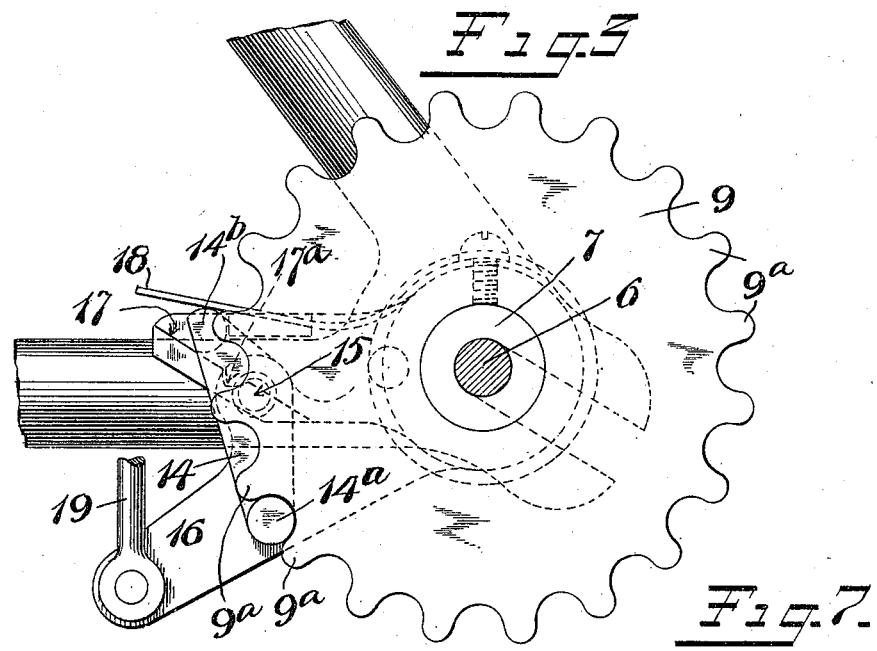
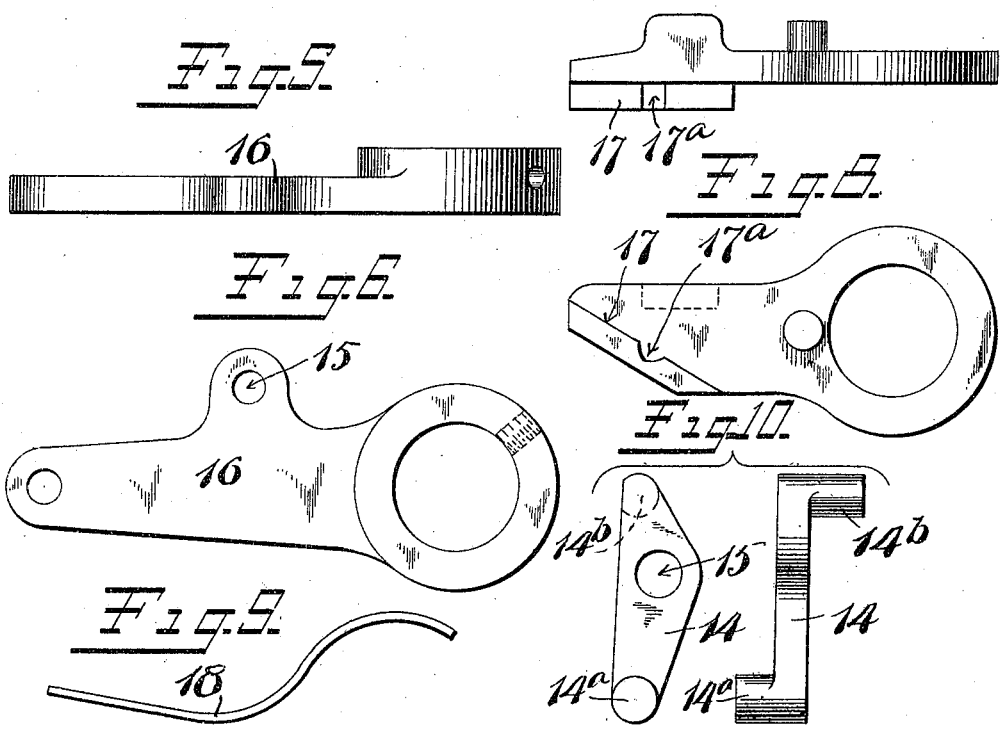
Witnesses:
Fred K. M. Dannenfelser
Chas. N. Peard
Inventor
HORACE K. JONES
By his Attorneys

UNITED STATES PATENT OFFICE.

HORACE K. JONES, OF HARTFORD, CONNECTICUT, ASSIGNOR TO CHARLES GLOVER, OF NEW BRITAIN, CONNECTICUT.

AUXILIARY COASTER-BRAKE ATTACHMENT.

975,432.  Specification of Letters Patent.  Patented Nov. 15, 1910.

Application filed April 27, 1910. Serial No. 557,961.

*To all whom it may concern:*

Be it known that I, HORACE K. JONES, a citizen of the United States, residing at Hartford, county of Hartford, State of Connecticut, have invented certain new and useful Improvements in Auxiliary Coaster-Brake Attachments, of which the following is a full, clear, and exact description.

My invention relates to improvements in auxiliary coaster brake operating devices arranged for manual operation, whereby, in the event of breakage of the sprocket chain or foot driving means, ordinarily employed for the operation of the coaster brake, said auxiliary means is available to be operated by the driver to check the vehicle. This apparatus is adapted to use on any of the usual forms of foot or pedal controlled coaster brakes, so-called.

In the drawings: Figure 1 is a longitudinal sectional view, showing certain parts in elevation, of my invention as applied to the driving hub of a bicycle; Fig. 2 is a section on the plane of the line x—x, Fig. 1, looking in the direction of the arrow; Fig. 3 is a view similar to Fig. 2, showing the parts in a different position; Fig. 4 is a plan view of the parts shown in Fig. 2; Figs. 5, 6, 7, 8, 9, 10, 11 and 12 are detail views.

In the particular form of my invention which I have elected to show herein, I have illustrated only a preferred embodiment of the various structural details. 1 represents the driving wheel hub; 2 a combined hub clutch and brake actuator; 3 a support for clutch 2; 4 a spiral thread connection between the clutch 2 and support 3; 5 an anti-friction bearing between support 3 and hub 1; 6 the usual center bolt; 7 a cone adjustable on the bolt 6; 8 an anti-friction bearing between the cone 7 and the outer end of support 3; 9 a driver or sprocket; 10—10 two brake shoes; 11—11 two brake shoe-operating cams; 12 a coupling device between the brake clutch or actuator 2 and the cams 11—11. The parts thus far described are those parts such as found in a well known hub coaster brake; these parts being so arranged that when the driver 9 is propelled in a forwardly direction, it draws the clutch 2 into engagement with the hub 1, so as to couple the driver with the hub for propelling the machine forward. To apply the brake in the ordinary manner the power applied to the mechanism through the driver 9 is reversed. This disengages the clutch 2 from the hub 1 and throws it into engagement with the coupling 12, whereby a continued rearward rotation of the driver expands the brake shoes 10—10, forcing them into contact with the hub 1 so as to apply resistance thereto.

Sometimes it happens that the chain by which power is applied to the driver from the source of power becomes broken, whereupon it follows that the rider would be in peril. To guard against such a calamity I have provided an improved manually operable auxiliary brake actuating mechanism which will permit the operator to apply the brake even though said chain should become broken. This actuating means operates directly upon the driver 9 and preferably upon its periphery between the teeth thereof so that even should the chain become broken the driver may be actuated in a reverse direction, that is, in a direction to apply the brake to the hub. By engaging with the teeth, located on the greatest diameter of the driver, it is obvious that the greatest leverage can be obtained, whereby it follows that the strain upon the auxiliary actuating means is correspondingly light or easy, thus making it possible to employ a very simple and compact actuating means.

14 is what I will term a pawl.

14$^a$ represents the driver engaging end of the pawl 14, said end being adapted to enter between any of the teeth 9$^a$—9$^a$ at the periphery of the driver 9.

16 is a pawl carrier pivotally mounted on the cone 7. The pawl 14 is pivotally mounted on the carrier on the axis 15. The pawl 14 has a cam engaging end 14$^b$ opposite the driver engaging end 14$^a$.

17 is a cam or inclined abutment, upon which the cam engaging end of the pawl 14 bears, being preferably held against said incline or cam by means of a spring 18.

19 may be termed a handle, connected to the pawl carrier 16, and by which handle the operator of the vehicle may operate said pawl carrier in a direction to operate the brake should the chain (not shown) usually employed with sprocket wheels become broken.

This auxiliary brake mechanism is of course located adjacent to a part of the sprocket not covered or engaged by the driving chain, such position being indicated in the drawings, Figs. 2 and 3.

The operation is as follows: When the parts stand as shown in Fig. 2, the auxiliary brake actuating means is out of engagement or idle, the pawl carrier being in its lower position. If for any reason it should become desirable to operate the brake by the auxiliary means, the operator pulls on the handle 19 and swings the pawl carrier from the position shown in Fig. 2 to that shown in Fig. 3. By this movement the pawl 14 is tilted into such position as to cause the driver engaging end $14^a$ to enter between two driver teeth $9^a$—$9^a$, whereupon a continued pull on the handle 19 turns the driver in a rearward direction, so as to apply the brake, as before described. When the machine has been sufficiently checked or stopped, the operator depresses the handle 19, which restores the pawl back to its original position, the cam engaging end $14^b$ riding down the incline of the cam 17, said incline being so pitched as to tilt the pawl on said riding down movement, thus disengaging the end $14^a$ from the sprocket or driver 9, so that the latter may be free.

$17^a$ is a notch preferably provided at the foot of the incline 17, into which the end $14^b$ of the pawl may drop and be retained by spring 18 at such times as the pawl is idle.

What I claim is:

1. In a coaster brake apparatus, a hub, a driver sprocket, a brake, means for connecting said driver sprocket with said brake for operating the latter in both a forward and a reverse direction, and an auxiliary means normally out of operative engagement with said sprocket for rotating said sprocket in a reverse direction only, said auxiliary means making operative connection with the periphery of said sprocket.

2. In a coaster brake apparatus, a hub, a driver sprocket, a brake, means for connecting said driver sprocket with said brake for operating the latter in both a forward and a reverse direction, and an auxiliary means normally out of operative engagement with said sprocket for rotating said sprocket in a reverse direction only, said auxiliary means making operative connection with the periphery of said sprocket, and including a hinged pawl carrier member, a pawl carried thereby, with means for tilting said pawl into and out of engagement with the periphery of said driver.

3. In a coaster brake, a hub, a brake therefor, a clutch for operative connection with said hub and with said brake independently, a driver sprocket operatively connected with said clutch for moving the same into operative engagement with the hub when rotated in one direction and into operative engagement with said brake when operated in a reverse direction, and an auxiliary manually operable brake controlling device arranged for engagement with and disengagement from said driver sprocket, said auxiliary means comprising a hinged arm, a pawl pivoted thereto, sprocket engaging means carried by said pawl at one end and means for engaging another part of said pawl to control the position of said sprocket engaging end, said means being so arranged relatively to the movement of the pawl that movement of said pawl by said carrier in one direction will tilt said pawl into operative engagement with the driver sprocket, while movement in an opposite direction will disengage said pawl from said sprocket.

4. In a coaster brake, a hub, a brake therefor, a clutch for operative connection with said hub and with said brake independently, a driver sprocket operatively connected with said clutch for moving the same into operative engagement with the hub when rotated in one direction and into operative engagement with said brake when operated in a reverse direction, and an auxiliary manually operable brake controlling device arranged for engagement with and disengagement from said driver sprocket, said auxiliary means comprising an arm hinged concentrically with said driver sprocket, a pawl pivoted thereto, sprocket engaging means carried by said pawl at one end and means for engaging another part of said pawl to control the position of said sprocket engaging end, said means being so arranged relatively to the movement of the pawl that movement of said pawl by said carrier in one direction will tilt said pawl into operative engagement with the driver sprocket, while movement in an opposite direction will disengage said pawl from said sprocket.

HORACE K. JONES.

Witnesses:
Geo. P. Spear,
S. C. Murphy.